United States Patent [19]

Vansickle et al.

[11] 4,194,863
[45] Mar. 25, 1980

[54] BIG BALE LOADER

[76] Inventors: Julius D. Vansickle; Major J. Vansickle, both of Rte. 3, Boswell, Okla. 74727

[21] Appl. No.: 927,837

[22] Filed: Jul. 25, 1978

[51] Int. Cl.² ............................................. A01D 87/12
[52] U.S. Cl. .................................. 414/24.5; 414/739
[58] Field of Search .................. 414/24.5, 24.6, 729, 414/738, 739; 294/88

[56] References Cited

U.S. PATENT DOCUMENTS

| | | | |
|---|---|---|---|
| 2,838,189 | 6/1958 | Norbury | 414/739 |
| 3,421,643 | 1/1969 | Barbee | 414/739 |
| 3,587,218 | 6/1971 | Geary | 56/343 |
| 3,677,428 | 7/1972 | Mallett | 294/88 X |

*Primary Examiner*—L. J. Paperner
*Attorney, Agent, or Firm*—Head & Johnson

[57] ABSTRACT

Apparatus for use with a tractor for lifting and transporting large cylindrical hay bales including a pair of lifting arms having the inner ends secured to the tractor frame, the arms being parallel to each other, a lifting plate affixed to the outer ends of the lift arms extending transversely of the arms and the tractor, a hydraulic lifting cylinder between the tractor frame and each lifting arm for raising the arms and thereby the lifting plate, a pair of side arms, the inner end of each being pivoted to the lifting arm, each side arm slidably resting on the lift plate adjacent the outer end, the lifting arms being pivoted towards and away from each other, the outer ends of the lifting arms being spread apart sufficient to receive a large bale of hay therebetween, and a hydraulic grasping cylinder pivotally connected at opposite ends to the side arms whereby the side arms may be retracted towards each other to grasp a large bale of hay and the lifting cylinders hydraulically actuated to lift the bale of hay for transportation.

2 Claims, 2 Drawing Figures

BIG BALE LOADER

BACKGROUND AND OBJECTS OF THE INVENTION

In recent years the use of large diameter hay bales has increased in popularity among farmers in the United States and other countries. These large diameter bales of hay are cylindrical and typically about 4 to 6 feet in length and 4 to 6 feet in diameter, and may weigh 600 to 4,000 pounds. Such bales of hay obviously cannot be manually handled, and therefore, it is helpful if a means is provided for transporting the large bales of hay from one area to another.

The present invention is directed towards a device readily mountable on a typical farm tractor including a hydraulic system. The device is attached to the frame of the tractor and serves to provide an easy means whereby a farmer may drive up to a large bale of hay, grasp it and lift it for transportation. Further, the bale of hay may be elevated to a position for stacking or storage or for loading or unloading trucks and trailers.

It is therefore an object of this invention to provide an apparatus for use with a tractor for lifting and transporting large cylindrical hay bales.

More particularly, an object of this invention is to provide an apparatus which is readily mountable on a typical farm tractor for lifting and transporting large cylindrical hay bales, the apparatus including the lifting arms actuated by hydraulic cylinders and grasping arms actuated by a hydraulic cylinder, the grasping arms being adaptable to engage a large cylindrical bale of hay and the lifting arms being adapted to elevate the bale of hay so that it may be transported by the tractor.

These general objects as well as other and more specific objects of the invention will be fulfilled in the following description and claims, taken in conjunction with the attached drawings.

SUMMARY OF THE INVENTION

An apparatus is described for use with a typical farm tractor for lifting and transporting large cylindrical bales of hay. The apparatus includes a pair of lifting arms, each having an inner end and an outer end. The inner end of each lifting arm is pivotally secured to the tractor frame. The lifting arms are supported on opposite sides of the tractor and generally parallel to each other and extend beyond the forward end of the tractor. An elongated lifting plate is affixed to the outer end of each of the lifting arms. The plate is horizontally supported by the lifting arms and forwardly of the tractor and transversely of the arms and the tractor. A hydraulic lifting cylinder-piston is provided for each lifting arm, one end of the cylinder-piston being pivotally attached to the tractor and the other end pivotally attached to the lifting arm. The hydraulic cylinders are connected in parallel for simultaneous operation so that when hydraulic pressure is applied simultaneously to the cylinder-piston, the lifting arms are caused to raise and, in like manner, by removing hydraulic pressure to the cylinder-piston, the arms are lowered. A pair of side arms is provided, each having an inner end and an outer end, the inner end of each of the side arms being pivotally attached to the lifting arm. Each of the side arms slidably rest on the lifting plate adjacent the outer end of the side arms so that the side arms extend forwardly of the lifting plate and generally parallel to each other. In this manner, the side arms slide on the lifting plate and the outer ends are pivotal and toward and away from each other. The outer ends of the side arms are adapted to engage a large hay bale when the side arms are spread apart and to grasp the hay bale when its outer arms are moved towards each other. A hydraulic grasping cylinder-piston is connected pivotally at its opposite end to the side arms so that the application of hydraulic pressure may be utilized to move the side arms towards or away from each other. With the large bale of hay grasped by the side arms with equal pressure on arms and bale, the lifting arms may be raised to lift the bale of hay for transportation by the tractor, and the bale of hay may be elevated by the lifting arms for placement in a storage position.

DETAILED DESCRIPTION

Figure 1:
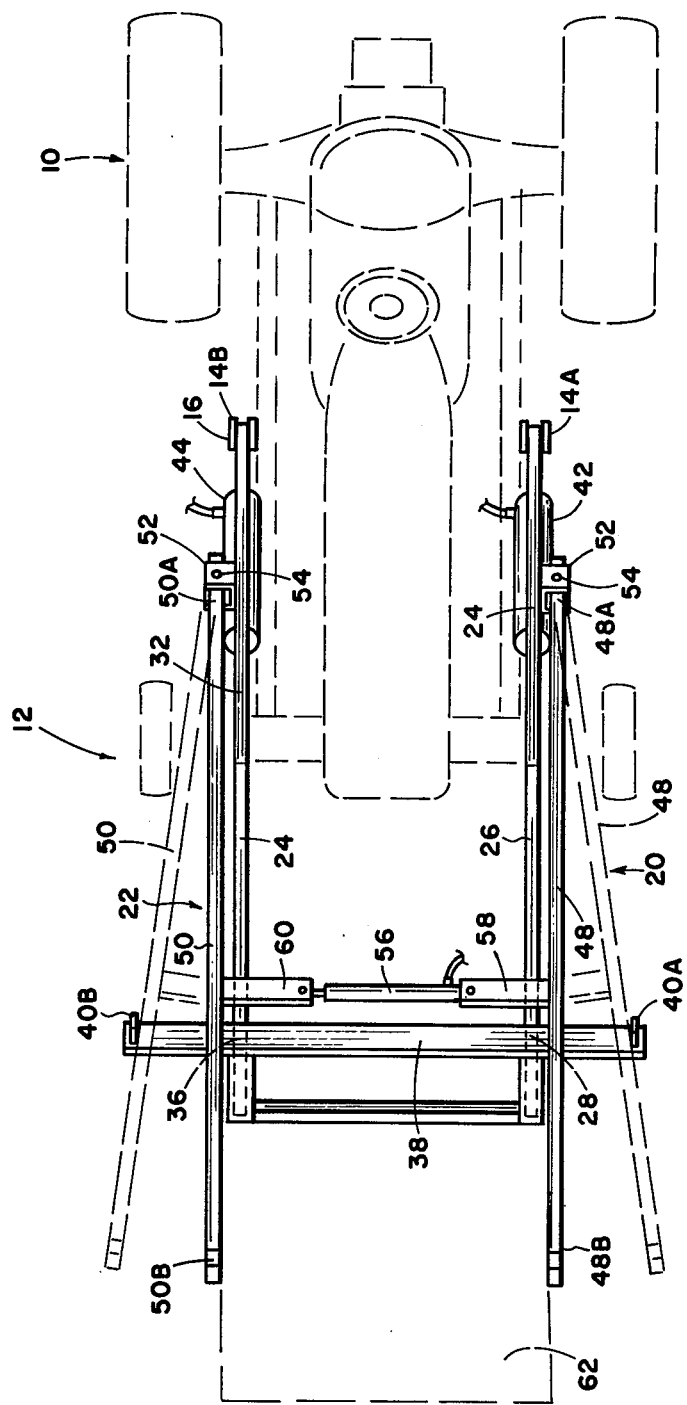
FIG. 1 is a top plan view of the apparatus of this invention mounted on a typical farm tractor for lifting large cylindrical bales of hay.
Figure 2:
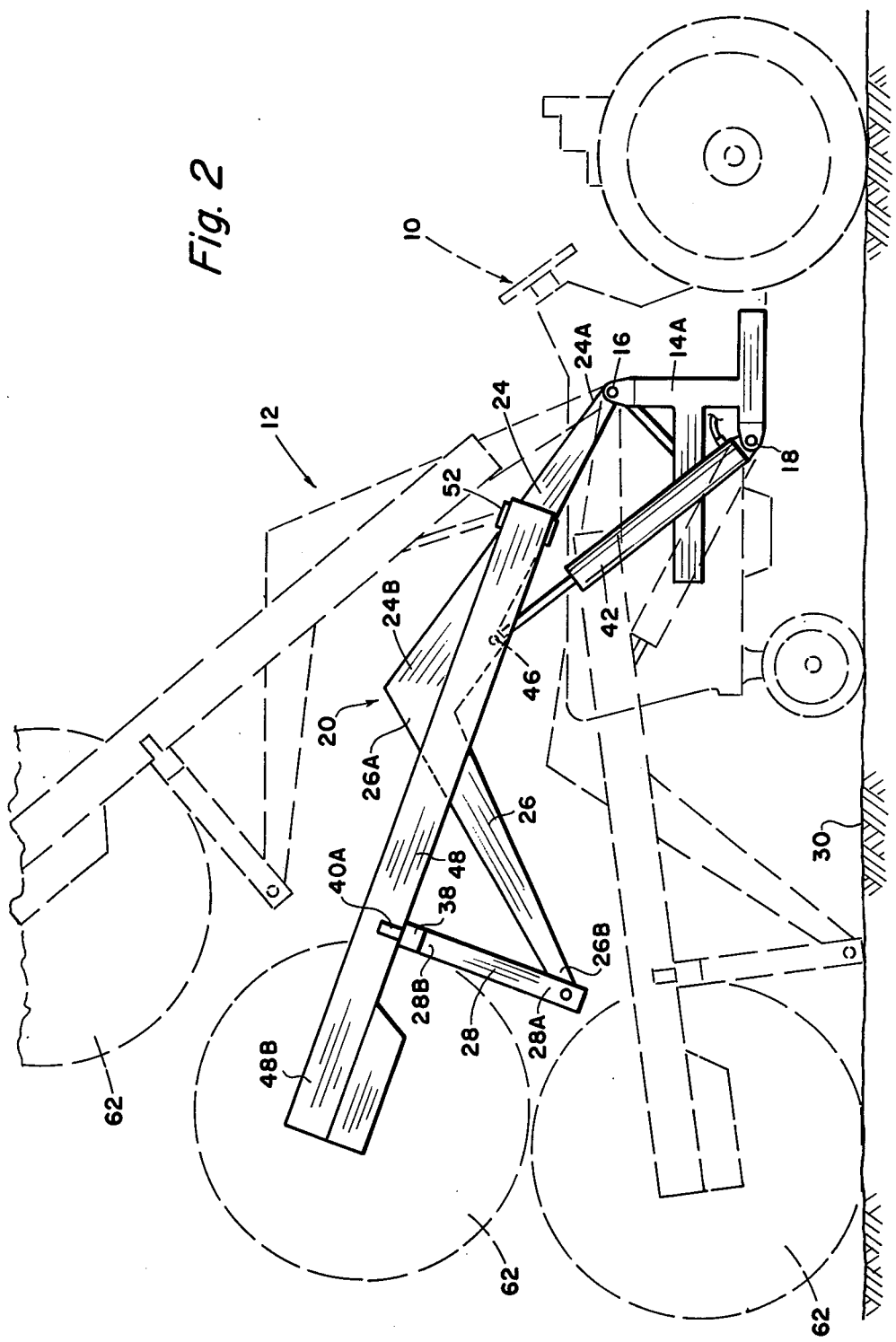
FIG. 2 is an elevational side view of the apparatus of FIG. 1 and showing the lifting apparatus and a large cylindrical bale of hay in three different elevational positions.

Referring to FIGS. 1 and 2, an apparatus exemplifying the large hay bale loader of this invention is illustrated. A typical farm type tractor is shown in dotted outline and indicated generally by the numeral 10. Attached to it is the large bale loader in solid outline and generally indicated by the numeral 12. Attached to the tractor 10 is a pair of lifting brackets 14A and 14B, there being one bracket on each side of the tractor. FIG. 2 shows the bracket 14A mounted on the left-hand side of the tractor. The exact configuration of brackets 14A and B depend upon the type of tractor to which the apparatus is attached and serve the purpose of attaching the apparatus to the tractor, and each bracket provides a lifting arm pivot point 16, and a lifting cylinder pivot point 18.

Pivotally attached to the brackets 14A and 14B are a pair of lifting arms indicated generally by the numerals 20 and 22. As best seen in FIG. 2, in the illustrated arrangement, each lifting arm consists of three portions. Referring specifically to the left-hand lifting arm 20, lifting arm first portion 24 has an inner end 24A and an outer end 24B. The inner end 24A is pivotally secured to the pivot point 16 of bracket 14A. Second portion of lifting arm 20 is indicated by the numeral 26 and includes an inner end 26A and outer end 26B. The inner end 26A is attached to the first portion outer end 24B. The lifting arm first and second portions 24 and 26 are attached to each other in a common vertical plane. The second portion 26B extends forwardly and downwardly of the first portion 24. The lifting arm third portion is indicated by the numeral 28 and includes a lower end 28A and an upper end 28B. The lower end 28A is attached to the second portion outer end 26B and is arranged so that when the lifting arms are pivoted towards the maximum downward position, the lower end 28A of the lifting arm third portion rests on the ground indicated by numeral 30.

The right-hand lifting arm 22, seen only in the top plan view of FIG. 1, includes first portion 32, second portion 34, and third portion 36, the right arm being a mirror image of the left arm shown in FIG. 2.

Extending horizontally across the upper ends of the lifting arm third portions 28 and 36 is an elongated horizontal lift plate 38. The upper surface of the lift plate 38 is unobstructed except for stop members 40A and 40B at each outer end.

In order to raise and lower the lifting arms 20 and 22, hydraulically actuated cylinder-pistons 42 and 44 are employed. One end of cylinder-piston 42 is attached to pivot point 18 on brackets 14A and, in similar manner, one end of the cylinder-piston 44 is attached to bracket 14B. The outer end of the cylinder-piston is attached at the pivot point 46 to the lifting arm first portion 24 and in like manner, the outer end of cylinder-piston 44 is attached to the right-hand lifting arm 32 at a pivot point. By use of hydraulic extension of the cylinder-piston 42 and 44, the lifting arms 20 and 22 are simultaneously raised or lowered to thereby raise or lower the lifting plate 38.

In order to grasp large hay bales, a pair of side arms are provided, indicated by the numerals 48 and 50. Each of the side arms is pivotally secured at its inner ends 48A and 50A respectively by a U-shaped bracket 52 and pivot pin 54 to lifting arm first portions 24 and 32.

The outer ends 48B and 50B of the side arms 48 and 50 extend forwardly of the tractor and forwardly of the lift plate 38. The side arms 48 and 50 slide on lift plate 38 and are prevented from moving off the outer ends of the lift plate by stops 40A and 40B. It can be seen that as lifting arms 20 and 22 are raised and lowered, the outer ends 48B and 50B of the side arms are in like manner raised and lowered.

The side arms are pivotal towards and away from each other as a slide on lifting plate 38. To control the position of the side arms relative to each other, a grasping cylinder-piston 56 is employed. One end of cylinder-piston 56 is pivotally attached to side arm 48 and the other end is pivotally attached to side arm 50. In the illustrated arrangement, brackets 58 and 60 are secured to side arms 48 and 50 respectively, which receive the outer pivotal connection of the cylinder-piston 56.

The hydraulic arrangement for applying or removing hydraulic fluid pressures to the lifting cylinder-pistons 42 and 44 and to the grasping cylinder-pistons 56 are not illustrated since they are known techniques well known to any manufacturer of farm equipment. Most farm tractors in use today include hydraulic systems for controlling farm implements and the typical farm tractor includes a hydraulic pump driven by the tractor engine for supplying hydraulic pressure. By simply mounting controls between the source of hydraulic pressure and the cylinder-piston employed by the apparatus of this invention, the loader can be utilized to grasp and lift large hay bales in the manner which will now be described.

OPERATION

Numeral 62 indicates in dotted outline a large hay bale. With the hay bale 62 resting on the ground 30, the operator di ves a tractor 10 up to the bale of hay and generally, to the point where the bale of hay is just forward of or in engagement with the lifting arm outer vertical portions 28 and 36. Cylinder piston 56 is actuated to spread the side arms 48 and 50 apart so that the outer ends 48A and 48B are wider than the length of the hay bale 62. The piston-cylinder 56 may then be actuated to withdraw the side arms 48 and 50 towards each other so that the outer ends 48B and 50B engage the ends of the hay bale 62 and firmly grasp the hay bale.

Next, the hydraulic cylinder-pistons 42 and 44 may be actuated to extend the length thereof, raising the lifting arms 20 and 22 to the position shown in solid outline in FIG. 2. In this position, the bale of hay 62 is lifted off the ground and the tractor may then be utilized to move the bale of hay to the desired position. The elvation of the bale of hay off the ground is at the option of the tractor driver. He may raise it to the elevated position shown in solid outline so as to safely see under the bale of hay for driving the tractor to the desired location for the bale of hay or he may lift it only sufficient to move it above the ground 30. If it is necessary to load the bale of hay to a higher elevation such as for stacking the bales of hay on top of each other, the hydraulic cylinder-pistons 42 and 44 may be extended further, to elevate the bale of hay 62 to a high location as shown in the upper dotted outline of FIG. 2.

When the bale of hay 62 is in the desired location, the arms 20 and 22 are lowered so that the bale of hay rests where desired. The grasping cylinder-piston 56 is de-actuated, or, stated in another way, is controlled hydraulically to move the grasping arms 48 and 50 apart to remove engagement with the hay bale.

It can be seen that by the arrangement of the side arms, pivotal to the lifting arms, the operator has a wide latitude in moving the tractor to the proper position for engaging and lifting a large bale of hay. It is not necessary that the tractor be exactly positioned centrally of the bale in order to engage and lift the bale. This latitude in aligning the tractor properly with the bale for lifting it enables the operator to work much more rapidly than with other types of lifting devices which must be accurately positioned relative to the bale of hay before it may be lifted for transportation.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. Apparatus for use with a tractor having a frame for lifting and transporting large cylindrical hay bales, comprising:
   a pair of lifting arms each having an inner end and an outer end, the inner end of each lifting arm being pivotally secured to a tractor frame, the arms being suppported on opposite sides of the tractor and generally parallel to each other;
   an elongated lift plate affixed to the outer end of each lift arm, the plate being horizontally supported by the lift arms and forwardly of the tractor;
   a hydraulic lifting cylinder-piston for each said lifting arm, one end of each cylinder-piston being pivotally attached to the tractor and the other end being pivotally attached to said lifting arm, whereby hydraulic pressure applied simultaneously to the cylinder-pistons causes the lifting arms to raise said lift plate;
   a pair of side arms each having an inner end and an outer end, the inner end of each arm being pivotally secured to a said lifting arm, each side arm slidably resting on said lift plate and the outer end of each side arm being spaced forward of the lifting plate, the said arms being pivotal towards and away from each other, the outer ends of the side arms being adapted to engage a large hay bale therebetween;

a hydraulic grasping cylinder-piston pivotally connected at opposite ends to the side arms whereby the outer ends of the side arms may be spread apart from each other to receive a large hay bale therebetween and moved towards each other to grasp a large bale of hay therebetween and in which condition said lifting arms may be pivoted upwardly to lift the grasped hay bale for transportating it, each of the lifting arms being defined by:

a first portion having inner and outer ends, the inner end being pivotally secured to the tractor, one end of said lifting cylinder-pistons being pivotally secured to the first portion adjacent the outer end thereof;

a second portion having an inner end and an outer end, the inner end being secured to the first portion outer end, the second portion extending forwardly and downwardly of said first portion and in the same vertical plane thereof; and a third portion having a lower end and an upper end, the lower end being affixed to the second portion outer end, said lift plate being horizontally secured to the third portion upper end, the lifting arm being dimensioned such that in its downwardly pivoted position the second portion outer end and third power lower end rest on the ground and the outer ends of said side arms are positioned above the ground approximately the radius of a large cylindrical hay bale whereby the side arms are properly positioned for grasping the opposed end of a cylindrical hay bale.

2. Apparatus according to claim 1 including upwardly extending stops at each outer end of said lifting plate to limit the pivotal outward movement of said side arm.

* * * * *